United States Patent [19]

Nakamura et al.

[11] 4,240,253
[45] Dec. 23, 1980

[54] ENGINE SYSTEM FOR MOTOR VEHICLE

[75] Inventors: Ken Nakamura, Kawasaki; Yasuo Nakajima, Yokosuka; Kunihiko Sugihara, Ichigaya-Takasho; Masanori Takami, Yokosuka, all of Japan

[73] Assignee: Nissan Motor Company, Limited, Yokohama, Japan

[21] Appl. No.: 861,663

[22] Filed: Dec. 19, 1977

[30] Foreign Application Priority Data

Dec. 20, 1976 [JP] Japan .................... 51/153173
Dec. 21, 1976 [JP] Japan .................... 51/153590
Dec. 22, 1976 [JP] Japan .................... 51/155328

[51] Int. Cl.$^3$ .................... F02M 23/08; F01N 3/10
[52] U.S. Cl. .................... 60/278; 60/289; 60/290; 123/568
[58] Field of Search .................... 60/278, 289, 290; 123/119 A

[56] References Cited

U.S. PATENT DOCUMENTS

| | | | |
|---|---|---|---|
| 3,961,477 | 6/1976 | Grieshaber | 60/278 |
| 3,983,697 | 10/1976 | Goto | 60/290 |
| 4,088,101 | 5/1978 | Wakita | 60/278 |

*Primary Examiner*—Douglas Hart

[57] ABSTRACT

An engine system of the invention comprises an internal combustion engine; a carburetor; an exhaust gas recirculation system; an exhaust gas treatment device; and a source of secondary air, in which there is provided a fluid network which interconnects the source of secondary air, the engine exhaust system at a position upstream of the exhaust gas treatment device and the exhaust gas recirculation system at a position upstream of an exhaust gas recirculation valve and there is also provided an air injection control valve fluidly disposed in the fluid network intermediate the source of secondary air and the exhaust gas recirculation system. The air injection control valve is adapted to selectively permit and prevent the admission of air to the exhaust gas recirculation system. A controller for the air injection control valve is also disclosed which comprises a detector that generates as an output signal a first signal responsive to urban driving conditions which are empirically determined to occur when the motor vehicle is driven in urban areas and a second signal responsive to rural driving conditions which are empirically determined to occur when the motor vehicle is driven in rural areas. The controller causes the air injection valve to permit the admission of air to the EGR system when the detector detects the rural driving conditions.

33 Claims, 20 Drawing Figures

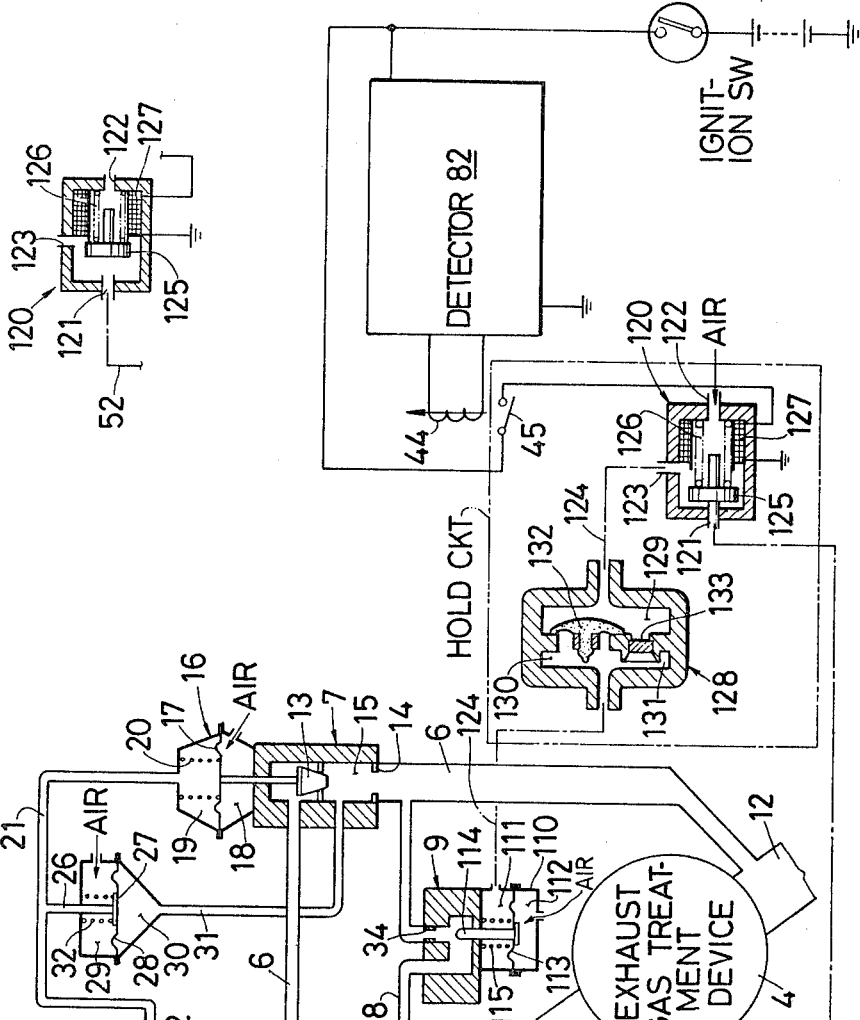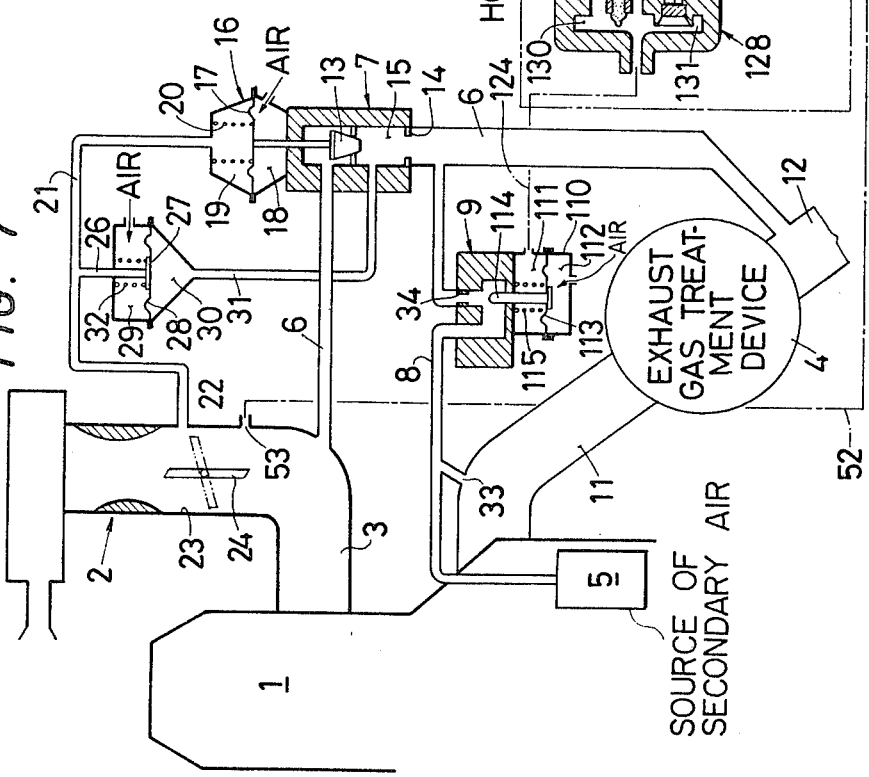

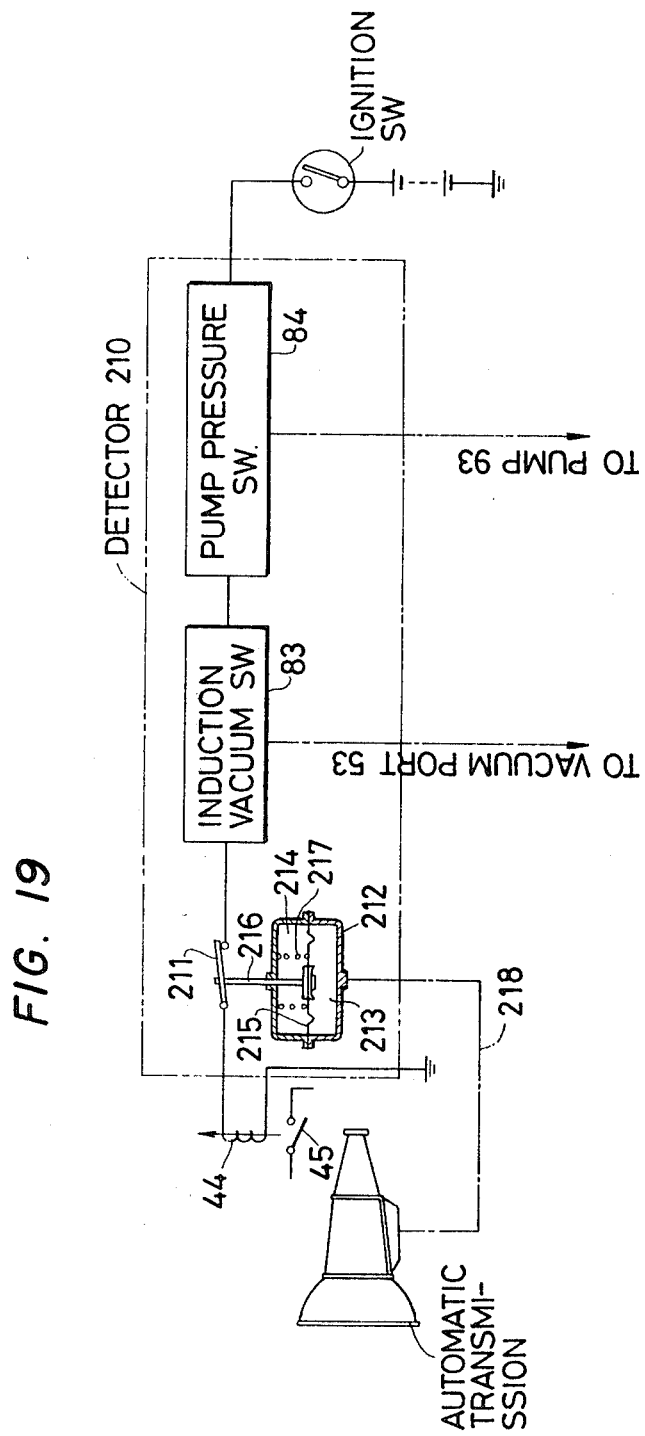

ENGINE SYSTEM FOR MOTOR VEHICLE

BACKGROUND OF THE INVENTION

This invention relates to an engine system for a motor vehicle, and more particularly to an engine system which has an internal combustion engine, a carburetor, an exhaust gas recirculation (EGR) system, an exhaust gas treatment device and a secondary air supply system.

An engine system is known which has an internal combustion engine, a carburetor, an EGR system, an exhaust gas treatment device and a secondary air supply system. With the EGR system a portion of exhaust gases resulting from the combustion in the engine is introduced into the engine intake manifold through which an air fuel mixture having an air fuel (A/F) ratio adjusted by the carburetor flows toward the engine to suppress peak combustion temperatures for lowering the probability of formation of oxides of nitrogen (NOx) during the combustion. It is known that if the ratio of the quantity of exhaust gases recirculated to the quantity of intake air admitted to the engine, i.e., EGR rate, is increased, the emission of NOx will decrease. Increasing the EGR rate, however, will cause a loss of the engine power output and since the probability of misfiring increases the engine will consume more fuel.

Air pollution resulting from the emission of oxides of nitrogen is a serious public nuisance particularly in urban areas and it is during acceleration and deceleration that occur cyclically and frequently when a motor vehicle is driven in urban areas that oxides of nitrogen are discharged to the open air in such quantities as to cause a serious air-pollution problem. However, when the motor vehicle is driven in rural areas, oxides of nitrogen are not discharged in such quantities as to cause an air-pollution problem because the quantity of oxides of nitrogen discharged is reduced during crusing which occupies a main part of driving of the motor vehicle in rural areas.

It is therefore desirable for reducing a loss of engine power output and improving fuel economy to reduce the EGR rate when the motor vehicle is driven in rural areas although when the motor vehicle is driven in urban areas the EGR rate is increased to such a degree as to reduce the quantity of oxides of nitrogen to a sufficiently low level.

Hydrocarbons (HC) and carbon monoxides (CO) contained in the exhaust gases are oxidized within the exhaust gas treatment device with the help of an air supplied from the secondary air supply system. For reducing the quantity of hydrocarbons and carbon monoxides to sufficiently low levels it is necessary to keep the temperature within the exhaust treatment device higher than the reaction temperature and it has been the common practice to set the carburetor so that an air fuel mixture to be admitted to the engine will be rich enough (A/F=12 to 13, for example) to insure sufficient reaction within the exhaust gas treatment device during acceleration and deceleration which occur cyclically and frequently when the motor vehicle is driven in urban areas because it is during cyclically and frequently occurring of acceleration and deceleration when the motor vehicle is driven in urban areas that the exhaust gas temperature drops. Setting so the carburetor, however, has caused a problem that when the motor vehicle is driven in rural areas an air fuel mixture to be admitted to the engine will become excessively rich for crusing that occupies a main part of driving of the motor vehicle in rural areas, causing overconsumption of fuel during driving of the motor vehicle in rural areas thus worsening the fuel economy of the motor vehicle. Empirically it has been recognited that it is necessary to supply rich air fuel mixture when the motor vehicle is driven in urban areas in order to keep the exhaust temperature high because under this condition the exhaust temperature tends to drop to make oxidation of HC and CO difficult. However, when the motor vehicle is driven in rural areas, the exhaust temperature is high enough for sufficient oxidation of HC and CO. Thus, with lean air fuel mixture sufficient oxidation of HC and CO will result.

SUMMARY OF THE INVENTION

It is therefore an object of the present invention to improve an engine system, which has an internal combustion engine, a carburetor, an exhaust gas recirculation system, an exhaust gas treatment device, such as a thermal reactor including an exhaust manifold having a reactor function, or an oxidizing catalytic converter, and a secondary air supply system, by reducing the effect of exhaust gas recirculation on driveability and by reducing the consumption of fuel when a motor vehicle is driven in rural areas so as to improve driveability and fuel economy of the motor vehicle.

One aspect of the invention resides in the provision of fluid network means which interconnects a source of secondary air, such as an air pump or an open air, the engine exhaust system at a position upstream of the exhaust gas treatment device, and an exhaust gas recirculation (EGR) conduit at a position upstream of an exhaust gas recirculation (EGR) valve, and of air injection control (AIC) means adapted to selectively permit and prevent the admission of a portion of the secondary air to the EGR conduit to effect, when the AIC means permits the admission of air to the EGR conduit, dilution of the exhaust gases to be recirculated and to lean out an air fuel mixture admitted to the engine.

The invention results from the recognition that should be overabundance of secondary air be admitted to the engine exhaust system, the exhaust gases to be recirculated might be diluted with a portion of the overabundance of secondary air, thus reducing the effect of the exhaust gas recirculation on NOx reduction, and thus another aspect of the invention resides in a conduit arrangement whereby air admitted to the engine exhaust system from the source of secondary air will be prevented from diluting the exhaust gases to be recirculated through the EGR conduit.

The invention results from the recognition that an air fuel mixture from the carburetor tends to become excessively rich when the motor vehicle is driven in rural areas if the carburetor setting is optimized to provide an air fuel mixture rich enough for active reaction within the exhaust gas treatment device during driving of the motor vehicle in urban areas, and thus another aspect of the invention resides in the provision of a controller, for the AIC means, having a detector which generates a first signal responsive to urban driving conditions which are empirically determined to occur when the motor vehicle is driven in urban areas and a second signal response to rural driving conditions which are empirically determined to occur when the motor vehicle is driven in rural areas. The controller will hold the AIC means in a first condition, in which the admission of an air to the EGR conduit is prevented, when the detector detects the urban driving conditions, while, the AIC means will be held in a second condition, in which the admission of an air to the EGR conduit is permitted, when the detector detects the rural driving conditions. The controller comprises a hold circuit to keep the AIC means in the first condition for a predetermined time period after the output of the detector has shifted from the first signal, indicative of urban driving conditions, to the second signal, indicative of rural driving conditions.

BRIEF DESCRIPTION OF THE DRAWINGS

The invention will be further described hereinafter in connection with the accompanying drawings, in which:

FIG. 7 is a similar view to FIG. 6 showing another form of a hold circuit using a solenoid actuated selector valve;

FIG. 7A is a partial view of FIG. 7 showing the state of the solenoid actuated selected valve when a solenoid thereof is energized;

FIGS. 10 to 19 show a various forms of a detector.

DESCRIPTION OF THE PREFERRED EMBODIMENTS

Figure 1:
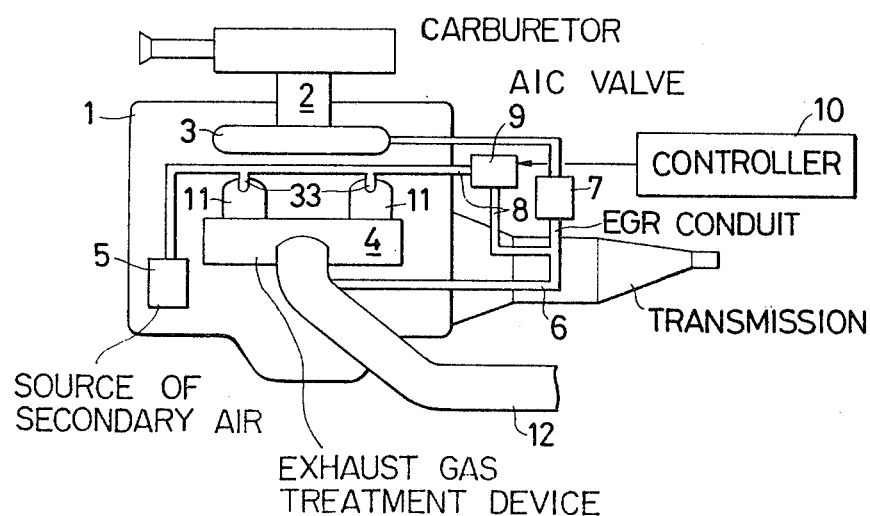
FIG. 1 is an engine system of the invention showing in block diagram an air injection control (AIC) valve and a controller for the AIC valve.

Referring to FIG. 1, there is shown an engine system according to the invention wherein the reference numeral 1 designates an internal combustion engine; the reference numeral 2 a carburetor; the reference numeral 3 an intake manifold; the reference numeral 4 an exhaust gas treatment device, such as a thermal reactor including an exhaust manifold having a reactor function or an oxidizing catalytic converter, the reference numeral 5 designates a source of secondary air which takes the form of an air pump driven by the engine although it may take the form of an open air; the reference numeral 6 an EGR conduit; the reference numeral 7 an EGR valve; and the reference numeral 8 a fluid network interconnecting the source of secondary air, an exhaust system at positions upstream of the exhaust gas treatment device 4 and the EGR conduit 6 at a position upstream of the EGR valve 7; the reference numeral 9 an air injection control (AIC) valve; and the reference numeral 10 a controller for the AIC valve 7.

Figure 2:
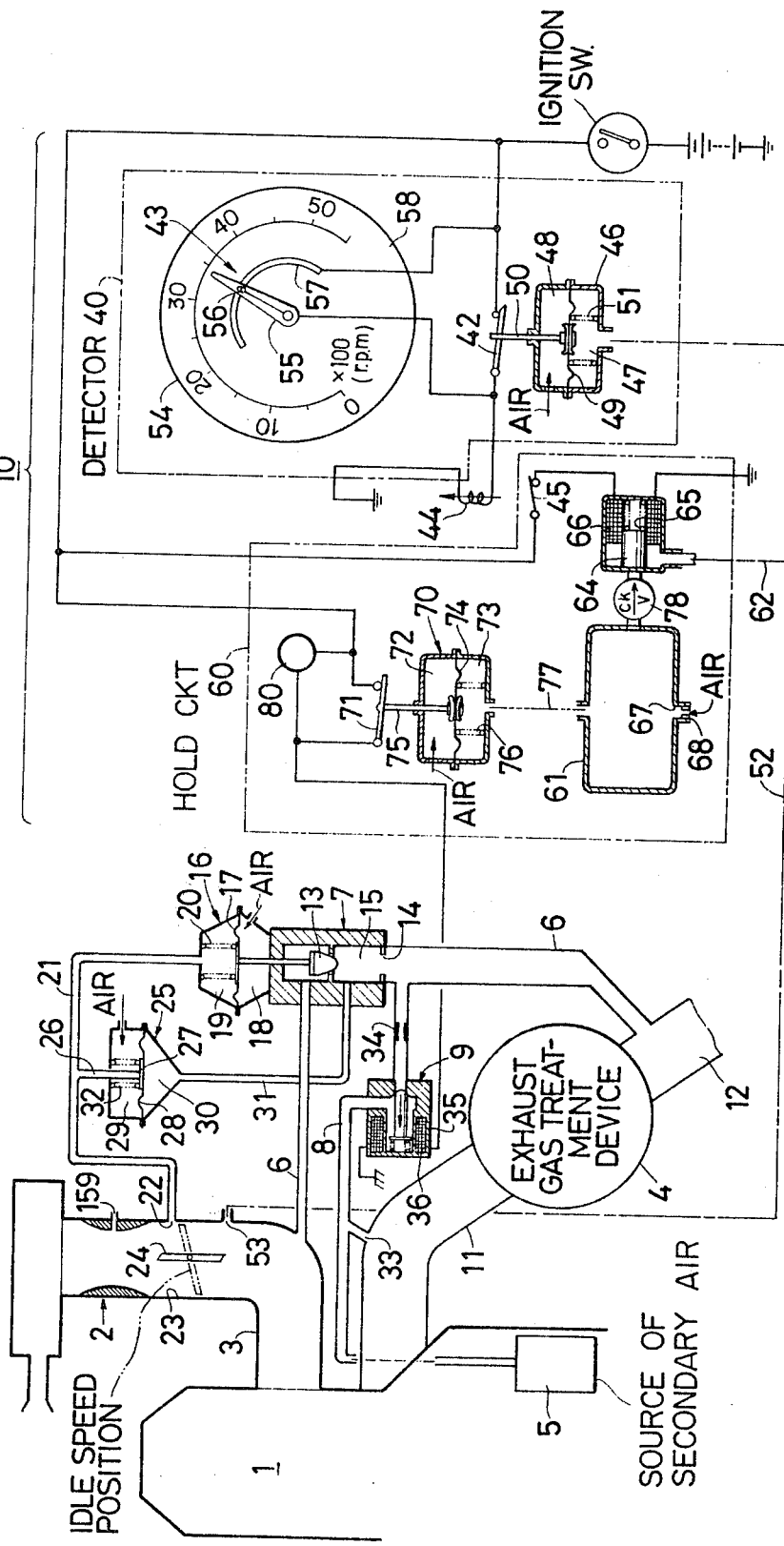
FIG. 2 is a schematic sectional view of the engine system showing shcematically the circuit diagram of a hold circuit and a detector of the controller.

Referring also to FIG. 2, the engine system is more specifically illustrated in which exhaust gas treatment device 4 is connected to engine 1 through a plurality of exhaust passage 11 (see FIG. 1) which directs the engine exhaust gases to exhaust gas treatment device 4 where hydrocarbon and carbon monoxide contained in the exhaust gases are oxidized. The gases having treated within exhaust gas treatment device 4 are discharged to the open air through an exhaust tail passage 12. Leading from exhaust tail passage 12 to intake manifold 3 at a position downstream of carburetor 2 is EGR conduit 6 to recirculate a portion of the gases flowing through exhaust tail passage 12 to intake manifold 3.

EGR valve 7 has a valve element 13 fluidly disposed in EGR conduit 6 and a flow restrictor in the form of an orifice 14 fluidly disposed in EGR conduit intermediate valve element 13 and exhaust tail passage 12. Valve element 13 and flow restrictor 14 cooperate to form therebetween a valve chamber 15. A vacuum servo 16 is provided to actuate valve 13 and has a diaphragm 17, to which valve element 13 is fixed, an atmospheric chamber 18 below diaphragm 17 and a vacuum chamber 19 above diaphragm 17 (viewing in FIG. 2). A spring 20 mounted within vacuum chamber 19 biases valve element 13 toward the illustrated closed position and a vacuum conduit 21 connects vacuum chamber 19 to a vacuum port 22 opening to an air induction passage 23 of carburetor 2. Vacuum port 22 is located at a position which will be disposed on the atmosphere side of a throttle valve 24 when it takes the idle speed position and on the vacuum side thereof when it is opened. Thus, as far as throttle valve is at the idle speed position, such as when engine 1 idles or operates under deceleration, vacuum level within vacuum chamber 19 reduces and approaches to atmosphere level, permitting spring 20 to keep valve element 13 in the illustrated closed position.

A vacuum level modulator 25 is provided to modulate vacuum level within vacuum chamber 19 in response to exhaust pressure within valve chamber 15 and has an air bleed port passage 26 communicating at one end with vacuum conduit 21 and has an opposite end cooperating with a valve element 27 fixed to a diaphragm 28. Above diaphragm 28 is an atmospheric chamber 29 and below diaphragm 28 is a pressure chamber 30 that is connected to valve chamber 15 through a conduit 31. A spring 32 mounted within atmospheric chamber 29 biases valve element 27 toward an open position to permit an air to flow to vacuum chamber 19 through air bleed port passage 26 and vacuum conduit 21, while diaphragm 28 urges valve element 27 toward the illustrated closed position against the action of spring 32 in response to pressure within valve chamber 15.

In operation, when engine 1 operates with throttle valve 24 opened, the engine induction vacuum will develope at vacuum port 22 to cause diaphragm 17 of vacuum servo 16 to be flexed upwards (viewing in FIG. 2) to move valve element 13 toward an open position. An increase in the opening degree of EGR valve 7 causes a drop in pressure within valve chamber 15 and thus within pressure chamber 30, causing an increase in the amount of air bled to vacuum chamber 19 to reduce vacuum level within vacuum chamber 19 tending to reduce the opening degree of EGR valve 7 to cause an increase in pressure within valve chamber 15, while the increase in pressure within valve chamber 15 causes a decrease in the amount of air bled to vacuum chamber 19 to increase vacuum level within vacuum chamber 19 tending to increase the opening degree of EGR valve 7 to cause a drop in pressure within valve chamber 15. Thus, pressure within valve chamber 15 is controllably kept almost constant when engine operates with throttle valve 24 opened. It will be noted that keeping pressure within valve chamber 15 constant, will cause EGR valve 7 to pass fluid through EGR conduit at a predetermined EGR rate (the ratio of the flow rate of fluid passing through EGR conduit 6 to that of intake air passing through induction passage 23).

Fluid network 8 has a plurality of air injection ports 33 opening to the inside of exhaust passages 11, respectively, and is provided with a flow restricting orifice 34. Flow restricting orifice 34 is disposed intermediate AIC valve 9 and EGR conduit 6.

AIC valve 9 takes the form of a normally closed valve which is openable by a solenoid actuator 35 when an actuator's solenoid 36 is energized and it permits the admission of a portion of air to EGR conduit 6 when solenoid 36 is energized or prevents the air admission when solenoid 36 is not energized.

Controller 10 comprises a detector 40 and energizes actuator's solenoid 36 to open AIC valve 9 for permitting the admission of air to EGR conduit 6 when detector 40 detects rural driving conditions, while, when detector 40 detects urban driving conditions, actuator's solenoid 36 is not energized to close AIC valve for preventing the admission of air to EGR conduit 6.

Figure 3:
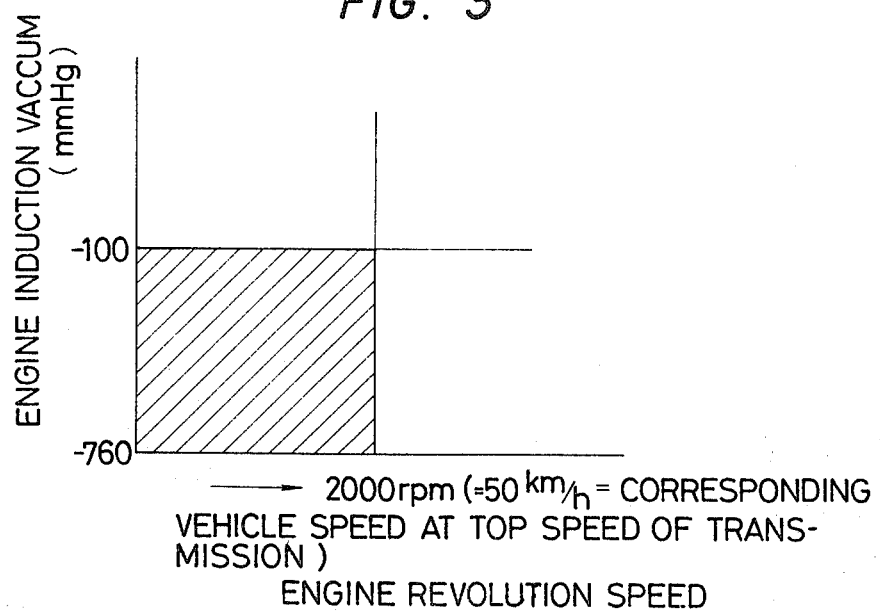
FIG. 3 is a graphical representation exemplifying a region of the motor vehicle (shadowed with oblique lines) at which the detector is kept in OFF condition responsive to the rural driving conditions.

Detector 40, which has resulted from the recognition that it is within the shadowed region as shown in FIG. 3 that the motor vehicle is driven in urban areas, comprises an induction vacuum responsive ON-OFF switch 42 and an engine revolution speed responsive ON-OFF switch 43 which are connected in parallel with respect to a relay coil 44 for a normally closed relay switch 45.

Induction vacuum responsive ON-OFF switch 42 is controlled by a diaphragm device 46 which detects variations in the inducting vacuum in intake manifold 3. Diaphragm device 46 has a vacuum chamber 47 and an atmospheric chamber 48 which is separated from the former by a diaphragm 49. Diaphragm 49 is operatively connected to switch 42 by a connecting rod 50 extending through atmospheric chamber 48. A spring 51 is mounted within vacuum chamber 47 to bias connecting rod 50 upwards (viewing in FIG. 2) toward the illustrated position in which switch 42 is closed. A vacuum conduit 52 connects vacuum chamber 47 to a vacuum port 53 that is at all times exposed to induction vacuum. Spring 51 is chosen such that when the induction vacuum is lower than a predetermined level of, for example, $-100$ mmHg, switch 42 is closed, while, when the induction vacuum is higher than the predetermined level, switch 42 is opened.

Engine speed responsive ON-OFF switch 43, on the other hand, is controlled by an engine revolution speed meter 54 having a pointer 55. Switch 43 is composed of a point contact 56 attached to pointer 55 and a plate contact 57 attached to an indicator disc 58 of meter 43. Plate contact 57 is arranged such that when engine revolution speed is higher than a predetermined value of, for example, 2,000 r.p.m., point contact 56 is kept in sliding contact with plate contact 57 so that switch 43 is closed, while, when engine revolution speed is lower than the predetermined value, point contact 56 is kept out of contact with plate contact 57 so that switch 43 is open.

It will be noted from the preceding description of detector 40 shown in FIG. 2 that relay coil 44 is energized when detector 40 detects rural driving conditions, while, when detector 40 detects urban driving conditions relay coil 44 is not energized because it is when the induction vacuum is higher than $-100$ mmHg and at the same time engine revolution speed is lower than 2,000 r.p.m. that the both switches 42 and 43 are opened.

Although, in detector 40 shown in FIG. 2, engine revolution speed is used as one of two variables to detect urban driving conditions as distinct from rural driving conditions, vehicle speed may be used, instead of engine revolution speed, in combination with induction vacuum. In this case, a point contact of a vehicle speed responsive switch is attached to a pointer of a vehicle speed meter and a plate contact attached to an indicator disc of the vehicle speed meter and the vehicle speed switch is connected in parallel with switch 43. The vehicle speed responsive switch is open when vehicle speed is lower than a predetermined value of, for instance, 50 km/h, while, when vehicle speed is higher than the predetermined value the vehicle speed switch is closed.

Preferably, controller 10 comprises a hold circuit 60 which comprises a vacuum tank 61 connected to vacuum port 53 through a branch conduit 62 and conduit 52. A solenoid actuated valve 63 has a valve element 64 fluidly disposed in branch conduit 62, a spring 65 biasing valve element 64 to the illustrated closed position in which fluid communication between vacuum tank 61 and intake manifold 3 is prevented, and a solenoid 66 connected in series with relay switch 45. When relay switch 45 is closed as relay coil 44 is not energized, solenoid 66 is energized to urge valve element 64, against the action of spring 65, toward an open position in which fluid communication between vacuum tank 61 and intake manifold 3 is established, thus applying the engine induction vacuum to vacuum tank 61. Vacuum tank 61 has an air bleed port 67 having mounted therein flow restrictor means 68. The level of vacuum within vacuum tank 61 is substantially equal to that of the engine induction vacuum when solenoid actuated valve 63 is opened and begins to reduce toward the level of atmosphere when solenoid actuated valve 63 is closed. The reduction speed in vacuum level within vacuum tank 61 will be determined by various factors including the volume of vacuum tank 61 and the effective flow area of flow restricting means 68. Preferably, flow restrictor means 68 takes the form of a sintered alloy rather than a flow restricting orifice. Since the effective flow area provided by the sintered alloy is smaller than that provided by the flow restricting orifice, the same effect could be given by a vacuum tank with a smaller volume if flow restrictor means 68 takes the form of a sintered alloy. A diaphragm device 70 is provided to actuate a switch 71 in response to variations in vacuum within vacuum tank 61. Switch 71 is circuited with solenoid 36 of AIC valve 9 so that solenoid 36 is energized when switch 71 is closed. Diaphragm device 70 has an atmospheric chamber 72 and a vacuum chamber 73 separated from the former by a diaphragm 74. A connecting rod 75 operatively connected to switch 71 extends through atmospheric chamber 72 and is fixed to diaphragm 74 and a spring 76 is mounted within vacuum chamber 73 to bias connecting rod 75 to the illustrated position in which switch 71 is closed. Vacuum chamber 73 communicates with vacuum tank 61 through a conduit 77. Spring 76 is chosen such that switch 71 is closed when the level of vacuum within vacuum tank 61 is lower than a predetermined level of, for example, −50 mmHg, while switch 71 is opened when the level of vacuum within vacuum tank 61 is higher than −50 mmHg. A check valve 78 is fluidly disposed in branch conduit 62 intermediate vacuum tank 61 and solenoid actuator valve 63.

The operation of the engine system shown in FIG. 2 will now be explained.

When the motor vehicle is driven in urban areas, detector 40 will be in OFF condition in which both switches 42 and 43 are open and thus relay coil 44 is not energized and relay switch 45 is closed. Closing of relay switch 45 will cause energization of solenoid 66 urging valve element 64 against the action of spring 65 to an open position in which fluid communication between vacuum tank 61 and intake manifold 3 is established, thus applying the engine induction vacuum to vacuum tank 61. Because the level of the engine induction vacuum is higher than −50 mmHg when detector 40 is in OFF condition, switch 71 is opened by diaphragm device 70, thus cutting the supply of current to solenoid 36 of AIC valve 9. As a result, AIC valve 9 is in the illustrated closed position to prevent the admission of a portion of secondary air to EGR conduit 6 through flow restricting orifice 34. Under this condition, therefore, exhaust gas recirculation is effected with a portion of gases discharged from exhaust gas treatment device 4 for reducing formation of NOx and secondary air is supplied to exhaust passages 11 upstream of exhaust gas treatment device 4 for promoting oxidation of HC and CO within exhaust gas treatment device 4.

Exhaust gas recirculation, however, will be prevented when engine 1 idles or operates under deceleration even if the motor vehicle is driven in urban areas because atmospheric pressure is applied to vacuum chamber 19 to permit spring 20 to close EGR valve 13 (see the illustrated position in FIG. 2) under this condition of engine 1.

When detector 40 has shifted its condition from OFF condition to ON condition that represents rural driving conditions, relay coil 44 will be energized to open relay switch 45 to cut the supply of current to solenoid 66. Then, solenoid actuated valve 63 cuts fluid communication between vacuum tank 61 and intake manifold 3, allowing the level of vacuum within vacuum tank 61 to begin to reduce from the level of the engine induction vacuum toward the level of atmosphere. Since the reduction of vacuum within vacuum tank 61 is gradual and takes a predetermined time of, for instance from 10 seconds to 15 seconds, until it reduces to −50 mmHg, switch 71 is kept open for the predetermined time after detector has shifted its condition from OFF condition representing urban driving conditions to ON condition representing rural driving conditions, and positive exhaust gas recirculation is kept continued for this predetermined time.

As the level of vacuum within vacuum tank 61 reduces below −50 mmHg, spring 76 will project connecting rod 75 to the illustrated position to close switch 71, thus permitting current to flow through solenoid 36 of AIC valve 9 to render AIC valve 9 into an open position to admit a portion of secondary air to EGR conduit 6 through flow restricting orifice 34, thus diluting the exhaust gases to be recirculated with air to reduce the effect of exhaust gas recirculation. Because the ratio of amount of fluid admitted to intake manifold 3 from EGR conduit 6 to amount of intake air in intake manifold 3 is kept almost constant by EGR valve 7, actual amount of exhaust gases to be recirculated from exhaust tail conduit 12 will decrease and be balanced by air from source of secondary air 5, thus reducing the effect of exhaust gas recirculation on driveability to improve engine performance during rural driving conditions. Moreover, because additional air is admitted to the intake manifold 3 through EGR conduit 6 to lean out air fuel mixture flowing through intake manifold 3 which otherwise would become rich during rural driving conditions, fuel consumption during rural driving conditions will be reduced.

The provision of hold circuit 60 will give the following advantage that a temporal ON condition, representing rural driving conditions, of detector 40 when the motor vehicle is driven in urban areas, for instance, when engine 1 is rapidly accelerated, will be neglected and positive exhaust gas recirculation will be kept. This, therefore, insures low emission of NOx when the motor vehicle is driven in urban areas.

Figure 4:
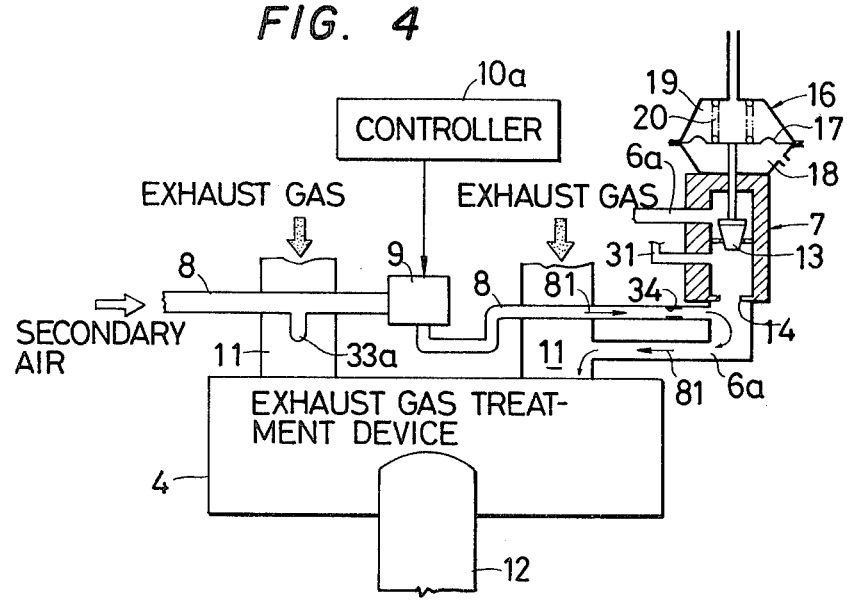
FIG. 4 is partial enlarged view of FIG. 1 showing a conduit arrangement whereby air admitted to the engine exhaust system from the source of secondary air will be prevented from diluting the exhaust gases to be recirculated through the EGR conduit.

Referring to FIG. 4, there is shown that part of a second embodiment of an engine system of the invention which differs from the previously described embodiment.

In FIG. 4, an EGR conduit 6a has one end connected to one of exhaust port passages 11 upstream of exhaust gas treatment device 4 and fluid network 8 has an injection port 33a opening to the inside of the remaining one of exhaust port passages 11 only.

Conduit arrangement shown in FIG. 4 is intended to solve the problem encountered in FIG. 2 embodiment that if an excessive amount of secondary air should be supplied to exhaust passages upstream of exhaust gas treatment device 4, gases discharged from the exhaust gas treatment device would be diluted with the excessive amount of air. This is because, in this embodiment, EGR conduit 6a receives a portion of the exhaust gases flowing through that one of exhaust passages 11 to which secondary air is not supplied.

Controller 10a in this embodiment differs from that of the previously described embodiment in that a throttle switch 80 is connected in parallel with switch 71 as shown in FIG. 2. Throttle switch 80 is closed only when throttle valve 24 is closed to cause AIC valve 9 to permit the admission of air to EGR conduit 6a even if switch 71 is open (see FIG. 1).

When, in operation, engine 1 idles or operates at deceleration in which throttle valve 24 is closed to cause throttle switch 80 to be closed, EGR valve 7 is closed and AIC valve permits the admission of air to EGR conduit 6a. Thus, under this condition, air will flow, as shown by arrows 81 in FIG. 4, through flow restricting orifice 34 and upstream section of EGR conduit 6a of EGR valve 7 to that one of exhaust passages 11 to which fluid network 8 does not open. It will, therefore, be understood that secondary air will be supplied to all of exhaust passages 11 when required, for instance, when engine 1 idles or operates at deceleration.

Figure 5:
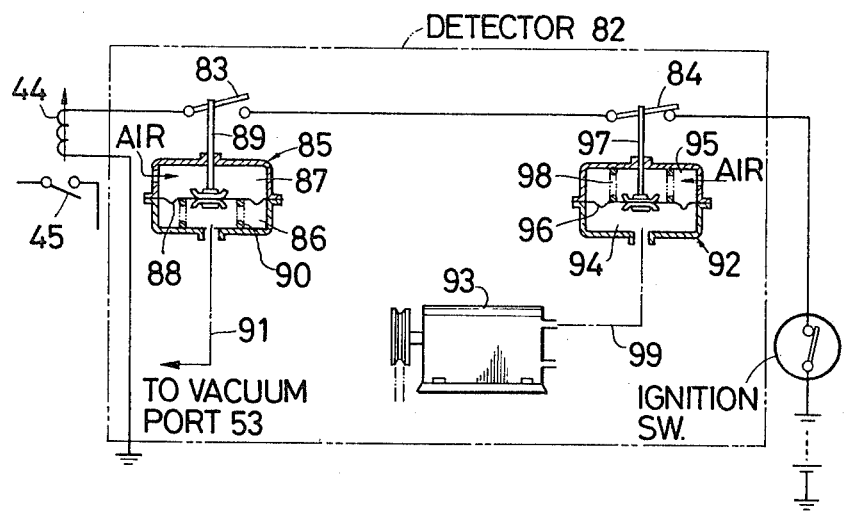
FIG. 5 shows an alternative example of a detector which is kept in ON condition at the shadowed region shown in FIG. 3.

Referring to FIG. 5, there is shown an alternative example of a detector to that shown in FIG. 2. Detector 82 shown herein differs from detector 40 in that detector 82 will be in ON condition to energize a relay coil 44 to close normally open relay switch 45 when the motor vehicle is driven in urban areas and in OFF condition when the motor vehicle is driven in rural areas, while, detector 40 will be in OFF condition when the motor vehicle is driven in urban areas and in ON condition when the motor vehicle is driven in rural areas.

Detector 82 comprises an induction vacuum responsive ON-OFF switch 83 and an engine driven pump discharge pressure responsive ON-OFF switch 84 connected in series with switch 83.

Induction vacuum responsive ON-OFF switch 83 is controlled by a diaphragm device 85 which detects variations in the induction vacuum in intake manifold 3(see FIG. 2). Diaphragm device 85 has a vacuum chamber 86 and an atmospheric chamber 87 which is separated from the former by a diaphragm 88 that is operatively connected to switch 83 by a connecting rod 89 extending through atmospheric chamber 87. A spring 90 is mounted within vacuum chamber 86 to bias connecting rod 89 upwards (viewing in FIG. 5) toward the illustrated position in which switch 83 is open. A vacuum conduit 91 connects vacuum chamber 86 to vacuum port 53 (see FIG. 2). Spring 90 is chosen such that when the induction vacuum is lower than a predetermined level of, for example, −100 mmHg, switch 83 is open, while, switch 83 is closed when the induction vacuum is higher than −100 mmHg.

Pressure responsive ON-OFF switch 84 is controlled by a diaphragm device 92 which detects variations in the discharge pressure of a pump 93 driven by engine 1, for instance, an air pump for supplying a secondary air or an oil pump. Diaphragm device 92 has a pressure chamber 94 and an atmospheric chamber 95 which is separated from the former by a diaphragm 96. Diaphragm 96 is operatively connected to switch 84 by a connecting rod 97 extending through atmospheric chamber 95. A spring 98 is mounted within atmospheric chamber 95 to bias connecting rod 97 downwards (viewing in FIG. 5) toward the illustrated position in which switch 84 is closed. A pressure conduit 99 connects pressure chamber 94 to the discharge side of engine driven pump 93. Spring 98 is chosen such that when the discharge pressure of pump 93 is lower than a predetermined level that is a level in the discharge pressure of pump 93 when engine 1 revolves at, for example, 2,000 r.p.m, switch 84 is closed, while, switch 84 is open when the discharge pressure of pump 93 is higher than this predetermined level (ref. FIG. 3).

Figure 6:
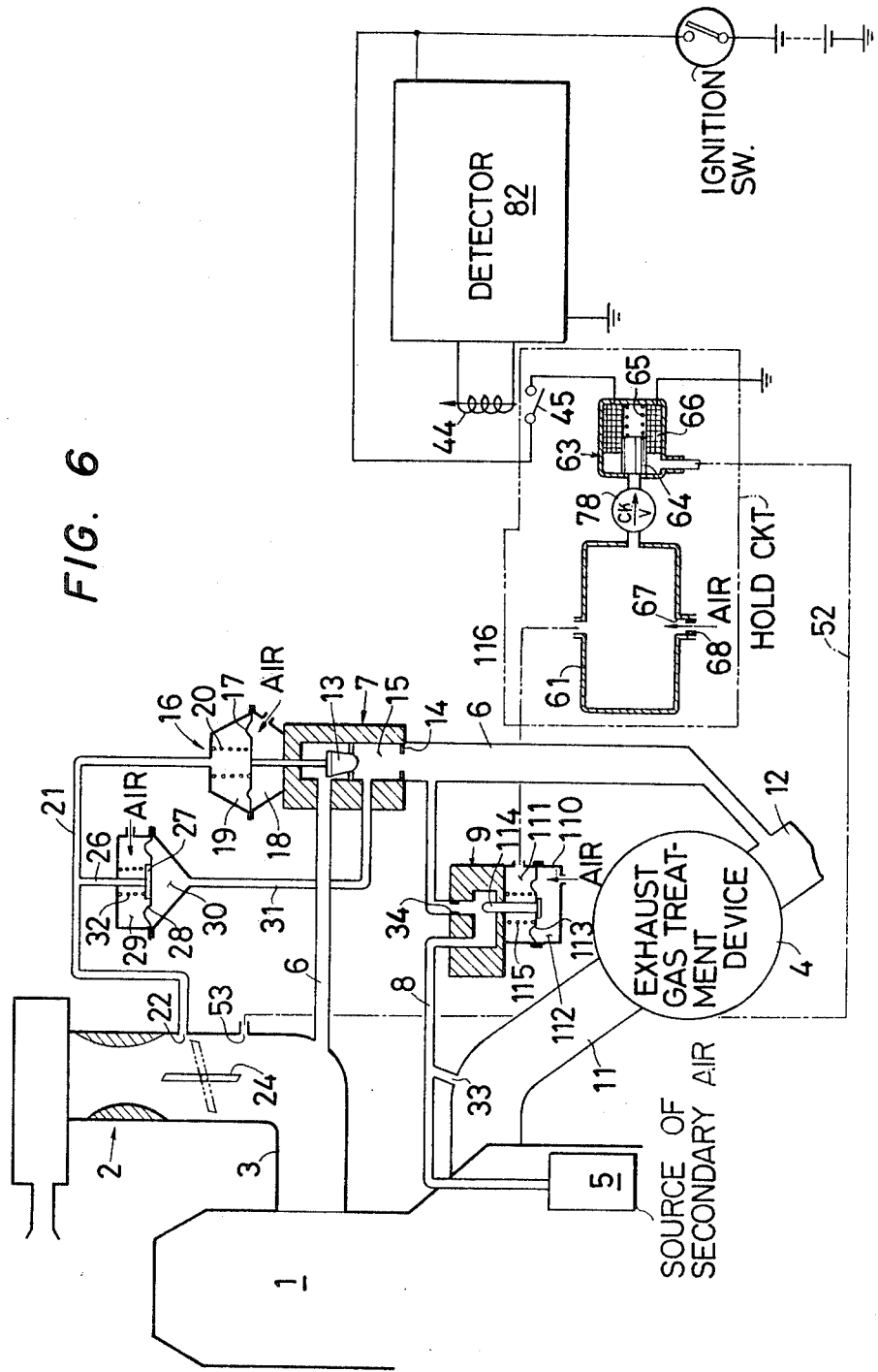
FIG. 6 is a similar view to FIG. 2 but employing the detector shown in FIG. 5, showing another form of an air injection control (AIC) valve and a hold circuit.

In previously described engine system shown in FIG. 2, AIC valve 9 is controlled by solenoid actuator 35, but AIC valve 9 may, if desired, be controlled by a vacuum servo 110 as shown in FIG. 6.

The embodiment shown in FIG. 6 differs from FIG. 2 embodiment in that detector 82 has been used instead of detector 40; and vacuum servo 110 has been directly connected to vacuum tank 61 to detect variations in vacuum within vacuum tank 61, thus eliminating solenoid actuator 35, switch 71 and diaphragm device 70 to control switch 71.

Vacuum servo 110 has a vacuum chamber 111 and an atmospheric chamber 112 which is separated from the former by a diaphragm 113. Diaphragm 113 is operatively connected to a plunger type valve element 114. A spring 115 is mounted within vacuum chamber 111 to bias valve element 114 downwards (viewing in FIG. 6) to the illustrated position in which fluid communication between source of secondary air 5 and EGR conduit 6 through fluid network 8 is established to permit the admission of air to EGR conduit 6. A vacuum conduit 116 connects vacuum chamber 111 to vacuum tank 61. Spring 115 is chosen such that when the level in vacuum within vacuum tank 61 is higher than a predetermined level of, for example, −50 mmHg, diaphragm 113 urges valve element 114 upwards (viewing in FIG. 6) against the action of spring 115 toward a valve closed position in which fluid communication between source of secondary air 5 and EGR conduit 6 through fluid network 8 is prevented to prevent the admission of air to EGR conduit 6, while, valve element 114 is in the illustrated position to permit admission of air to EGR conduit 6 when the level in vacuum within vacuum tank 61 is lower than this predetermined level. The operation of engine system shown in FIG. 6 is substantially the same as that of engine system shown in FIG. 2.

FIG. 7 shows still another embodiment which differs from the embodiment shown in FIG. 6 in its hold circuit. In FIG. 7, the hold circuit comprises a solenoid actuated selector valve 120 which has a vacuum port 121 connected to vacuum port 53, an air bleed port 122 opening to the open air and a control port 123 connected to vacuum chamber 111 by a vacuum conduit 124. Solenoid actuated selector valve 120 has a valve element 125, a spring 126 biasing valve element 125 toward the illustrated position shown in FIG. 7. in which fluid communication between air bleed port 122 and control port 123 only is established, and a solenoid 127 connected in series with normally open relay switch 45. Upon energization of solenoid 127, valve element 125 will be urged against the action of spring 126 toward the illustrated position shown in FIG. 7A in which fluid communication between vacuum port 121 and control port 123 only is established.

Preferably, a valve unit 128 is fluidly disposed in vacuum conduit 124 intermediate solenoid actuated valve 120 and vacuum servo 110 for delaying transmission of vacuum within vacuum chamber 111 to control port 123 only. Valve unit 128 has a first chamber 129 and a second chamber 130 which is separated from the former by a partition 131. Partition 131 has mounted therein a check valve 132 which permits air flow from chamber 130 to chamber 129 only and a flow restrictor 133 in the form of a sintered alloy arranged in parallel to check valve 132. Chamber 129 communicates with control port 123, while, chamber 130 with vacuum chamber 111 of vacuum servo 110 for AIC valve 9.

When, in operation, detector 82 is in ON condition representing urban driving conditions of the motor vehicle, relay coil 44 will be energized to cause relay switch 45 to be closed to supply current to solenoid 127 of solenoid actuated selector valve 120. Upon energization of solenoid 127 valve element 125 will be moved to the illustrated position in FIG. 7A to establish fluid communication between intake manifold 3 and vacuum chamber 111 of vacuum servo 110 for AIC valve 9 through vacuum conduit 52, port 121, port 123, chamber 129, check valve 132 and chamber 130. As a result, the induction vacuum within intake manifold 3 will immediately develop in vacuum chamber 111 of vacuum servo 110 urging plunger type valve element 114 upwards (viewing in FIG. 7) to a valve closed position to prevent the admission of a portion of secondary air to EGR conduit 6 through flow restricting orifice 34.

When, on the other hand, detector 82 shifts its condition from ON condition to OFF condition that represents rural driving conditions of the motor vehicle, relay switch 45 will be opened to cut the supply of current to solenoid 127 of solenoid actuated selector valve 120. Then, valve element 125 will be moved to the illustrated position in FIG. 7 under the bias of spring 126 to close port 121 and establish fluid communication between control port 123 and air bleed port 122, and reduction of vacuum within vacuum chamber 111 of vacuum servo 110 for AIC valve 9 will begin. Atmospheric air will be bled into vacuum chamber 111 via air bleed port 122, control port 123, chamber 129, flow restrictor 133 and chamber 130. It will be noted that flow restrictor 133 will delay the reduction of vacuum within vacuum chamber 111 so that AIC valve 9 will be kept in the closed position to prevent the admission of air to EGR conduit 6 for a predetermined time after detector 82 has shifted its condition from ON condition to OFF condition.

If it is desired to eliminate valve unit 128 for some reason, vacuum chamber 111 of vacuum servo 110 for AIC valve 9 shall communicate directly with control port 123 and air bleed port 122 shall be provided with a flow restrictor.

Figure 8:
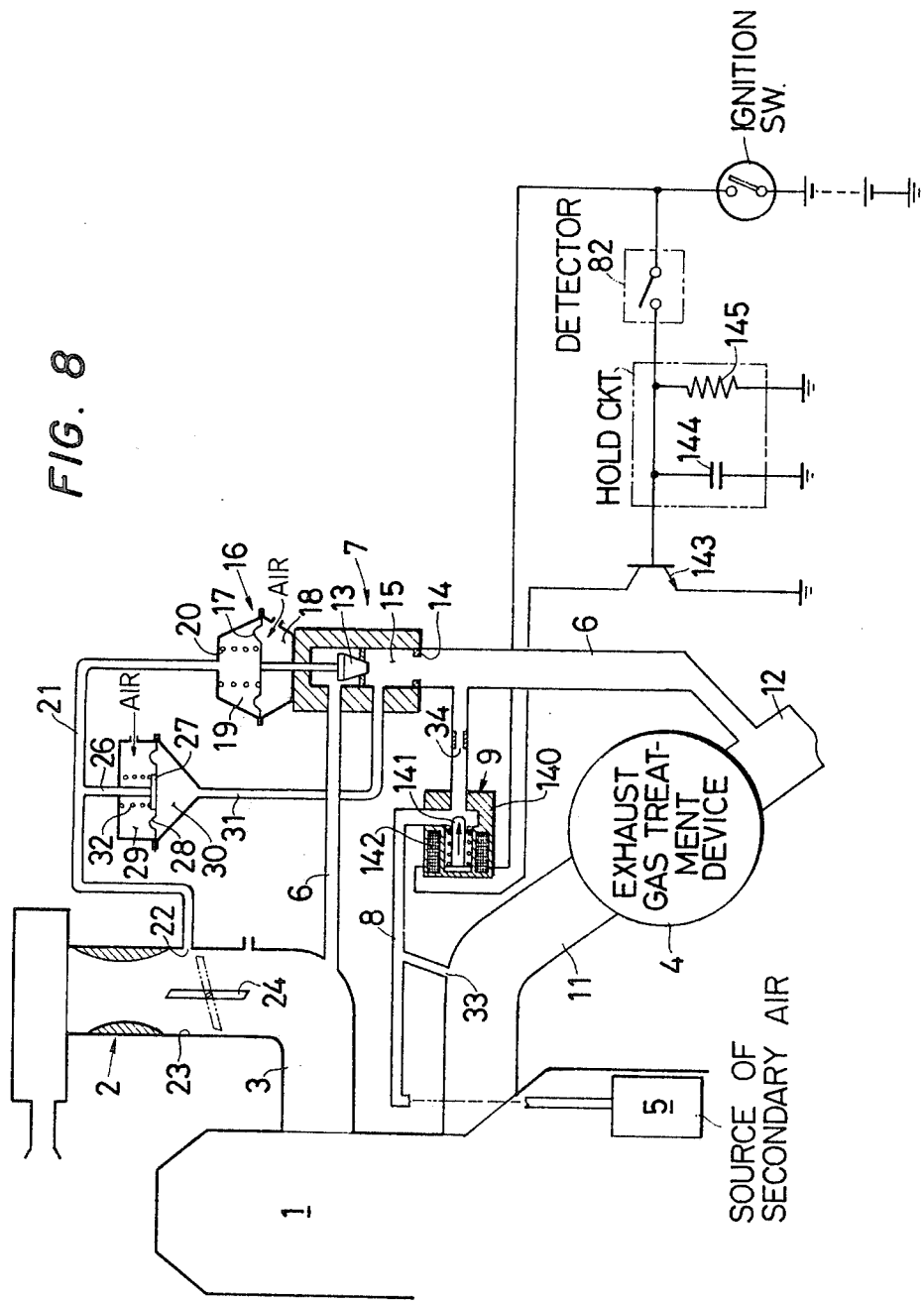
FIG. 8 is a similar view to FIG. 2 showing another form of an AIC valve and a hold circuit, the detector used in this Figure is of the type which is kept in ON condition when it detects the urban driving conditions.

Referring to the embodiment shown in FIG. 8, AIC valve is controlled by a solenoid device 140 which will hold a valve element 141 in the illustrated open position when a solenoid 142 is not energized for permitting the admission of a portion of secondary air to EGR conduit 6 through orifice 34, but will urge valve element 141 to the right (viewing in this Figure) toward a closed position when solenoid 142 is energized for preventing the admission of air to EGR conduit 6. Solenoid 142 is connected in series with the collector emitter circuit of a n-p-n switching transistor 143 whose base circuit comprises a time constant circuit consisting of a capacitor 144 and a resistor 145 and a detector 82 that will be closed responsive to urban driving conditions of the motor vehicle, but will be opened responsive to rural driving conditions of the motor vehicle.

When, in operation, detector 82 has shifted its condition from ON condition to OFF condition, switching transistor 143 will be kept in ON condition for a predetermined time, that is determined by the time constant of the time constant circuit consisting of capacitor 144 and resistor 145, to keep AIC valve 9 in closed position to prevent the admission of air to EGR conduit 6 for the predetermined time.

Figure 9:
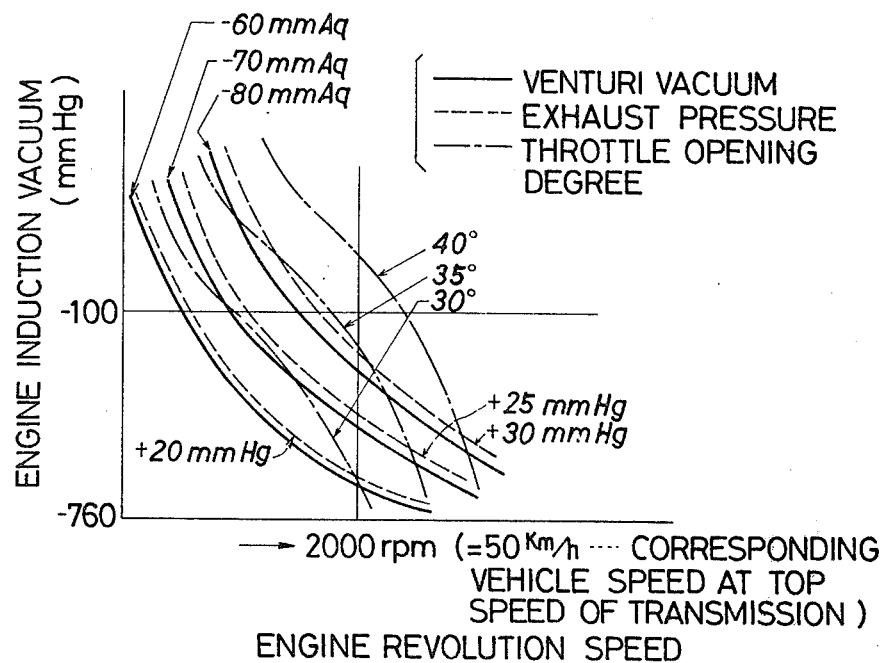
FIG. 9 is a graphical representation similar to FIG. 3.

Referring to FIGS. 10 to 13, four examples of a detector will be described. They have resulted from the recognition that urban driving conditions of the motor vehicle (shadowed area in FIG. 3) can be approximately detected by using only one of engine parameters indicative of the amount of engine intake air as will be readily understood from FIG. 9 which shows characteristic curves representing such engine parameters. Thus, detectors shown in FIGS. 10 to 13 are different from detectors 40 and 82 in that the former group employ only one engine parameter to detect urban driving conditions of the motor vehicle, while, the latter group two engine parameters to detect the same.

Figure 10:
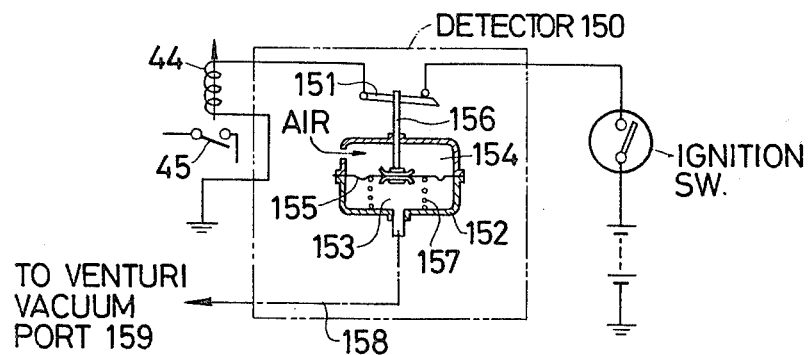

Detector 150 shown in FIG. 10 employs, as an engine parameter, venturi vacuum and comprises a venturi vacuum responsive ON-OFF switch 151 connected in series with a relay coil 44 for a normally open relay 45 (ref. FIG. 2 in conjunction with FIG. 5). Venturi vacuum responsive switch 151 is controlled by a diaphragm device 152 having a vacuum chamber 153 and an atmospheric chamber 154 which is separated from the former by a diaphragm 155. Diaphragm 155 is operatively connected with switch 151 by a connecting rod 156 extending through atmospheric chamber 154. Spring 157 is mounted within vacuum chamber 153 to bias connecting rod 156 toward the illustrated position in which switch 151 is closed. A vacuum conduit 158 connects vacuum chamber 153 to a venturi vacuum port 159 (see FIG. 2). Spring 157 is chosen such that when the level of venturi vacuum is lower than a predetermined level of, for example, $-80$ mmAq (see FIG. 9), switch 151 is closed, while, switch will be opened when venturi vacuum is higher than this predetermined level. It will be noted from FIG. 9 that selecting $-80$ mmAq as the predetermined level across which switch 151 shifts its condition will permit us to assume that detector 150 will become in ON condition to energize relay coil 44 when the motor vehicle is driven in urban areas, while, when the motor vehicle is driven in rural areas, detector 150 will become in OFF condition to cut the supply of current to relay coil 44 thus rendering relay switch 45 open again.

Figure 11:
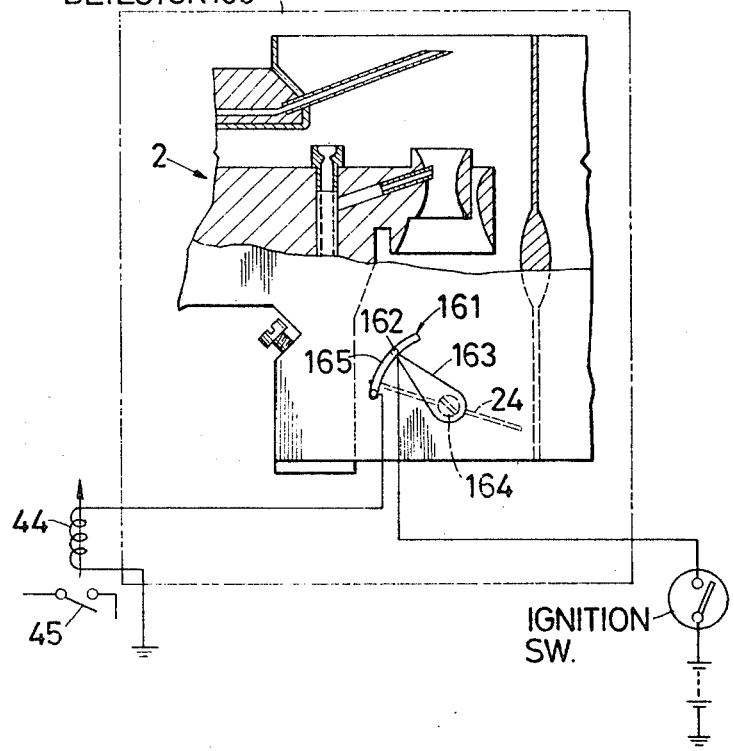

Detector 160 shown in FIG. 11 employs throttle opening degree of a carburetor and comprises a throttle opening degree responsive ON-OFF switch 161 connected in series with relay coil 44 for normally open relay switch 45. Throttle opening degree responsive switch 161 has a point contact 162 fixedly attached to an arm 163 coupled to a throttle valve shaft 164 to be rotatable with throttle valve 24, and a fixed plate contact 165 mating with the contact 162. Switch 161 is designed such that when the opening degree of throttle valve 24 is smaller than a predetermined angle of approximately 35 degrees, for example (see FIG. 9), i.e., when the throttle valve 24 is operating within a range from 0 degree to approximately 35 degrees, contact 162 is in sliding contact with contact 165 thus rendering switch 161 in closed condition, while, contact 162 is out of sliding contact with contact 165 rendering switch 161 open when the opening degree of throttle valve 24 is greater than the predetermined angle. It will be noted from FIG. 9 that selecting 35 degrees as the predetermined angle across which switch 161 changes its state will permit us to assume that detector 160 will take ON condition to energize relay coil 44 when the motor vehicle is driven in urban areas, while, when the motor vehicle is driven in rural areas, detector 160 will take OFF condition to cut supply of current to relay coil 44 thus rendering relay switch open again.

Figure 12:
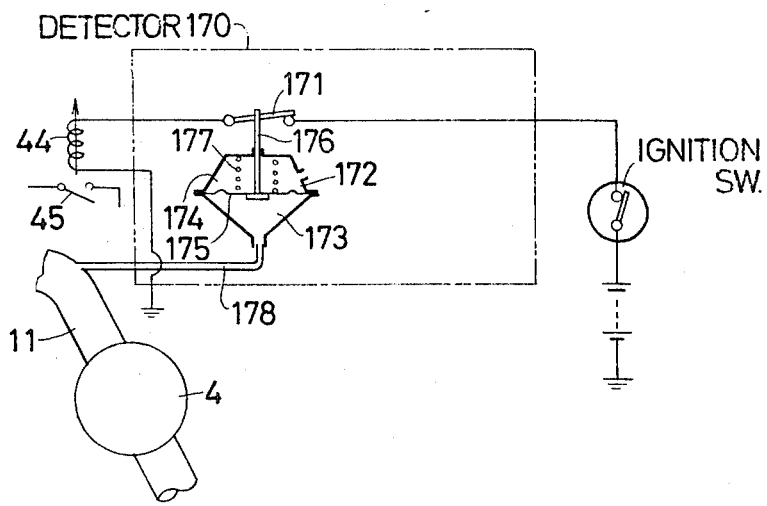

Detector 170 shown in FIG. 12 employs exhaust pressure in exhaust passage 11 upstream of exhaust gas treatment device 4 and comprises an exhaust gas pressure responsive ON-OFF switch 171 connected in series with a relay coil 44 for normally open relay switch 45. Exhaust gas pressure responsive ON-OFF switch 171 is controlled by a diaphragm device 172 having a pressure chamber 173 and an atmospheric chamber 174 which is separated from pressure chamber 173 by a diaphragm 175. Diaphragm 175 is operatively connected to switch 171 by a connecting rod 176. Spring 177 is mounted within atmospheric chamber 174 to bias connecting rod 176 toward the illustrated position in FIG. 12 in which switch 171 is closed. A conduit 178 connects pressure chamber 173 to exhaust passage 11 to permit the exhaust pressure within exhaust passage 11 to be transmitted to pressure chamber 173. Spring 177 is chosen such that when the exhaust pressure is lower than a predetermined level of, for example, 30 mmHg(see FIG. 9), switch 171 is closed, while, switch 171 is opened when the exhaust pressure is higher than the predetermined level. It will be noted that selecting 30 mmHg as the predetermined level across which switch 171 changes its state will permit us to assume that detector 170 will take ON-condition to energize relay coil 44, rendering relay switch 45 closed when the motor vehicle is driven in urban areas, while, when the motor vehicle is driven in rural areas, detector 170 will take OFF condition to cut the supply of current to relay coil 44 rendering relay switch 45 open.

Figure 13:
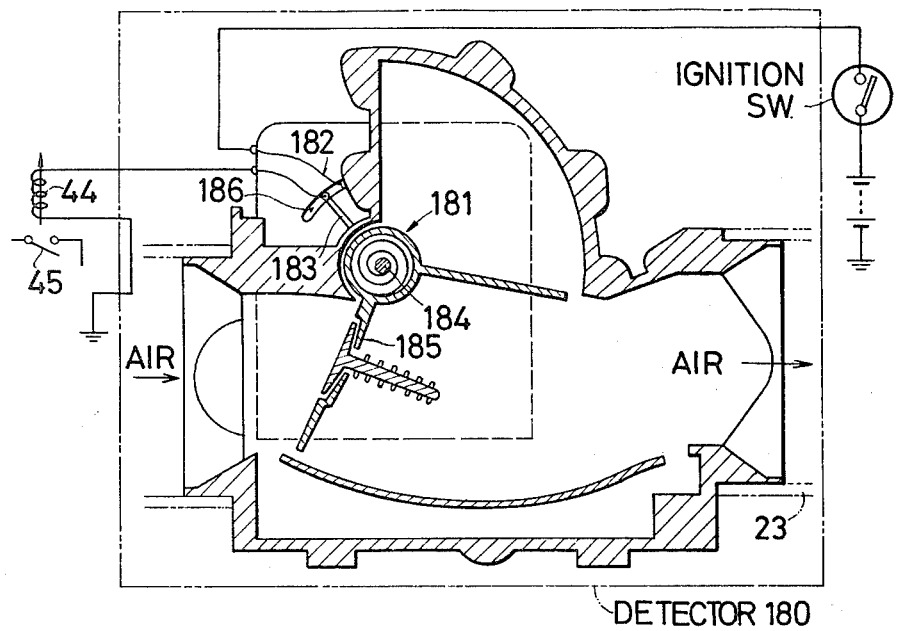

Detector 180 shown in FIG. 13 employs an air flow sensor 181 which detects the amount of intake air flowing through an air induction conduit 23 upstream of throttle valve 24 (see FIG. 2), and comprises an intake air flow responsive ON-OFF switch 182 connected in series with relay 44 for normally open relay switch 45. Air flow responsive switch 182 has a movable contact arm 183 connected to a rotary shaft 184 of a flap 185 to be rotatable with flap 185, and a fixed contact 186. Switch 182 is designed such that when the opening degree of flap 185 is smaller than a predetermined angle, contact arm 183 is in slidable contact with contact 186 rendering switch 182 closed to energize relay coil 44 to close relay switch 45, while, when the opening degree of flap 185 is greater than the predetermined angle, contact arm 183 is out of contact with 186 thus rendering switch 182 open to cut supply of current to relay coil 44 to render relay switch 45 open again. This predetermined angle across which switch 182 change its state is determined so that when the motor vehicle is driven in urban areas, detector 180 will take ON condition, while, detector 180 will take OFF condition when the motor vehicle is driven in rural areas.

Referring to FIGS. 14 to 19, six examples of a detector will be described. Detectors shown in FIGS. 14 to 19 are common in that they include a gear switch of the ON-OFF type which becomes ON when it detects one of high and low speed ranges of a transmission and becomes OFF when it detects the other speed range of the transmission. The use of speed ranges of the transmission as one factor to detect urban driving conditions has resulted from the recognition that when the motor vehicle is driven in urban areas, the low speed range of the transmission is frequently used, while, the high speed range of the transmission is used when the motor vehicle is driven in rural areas. However, with the gear switch only, it is impossible to neglect the case in which the low speed range may be used when the motor vehicle is driven in rural areas. Thus, in each of the following examples shown in FIGS. 14 to 19, a combination with the gear switch of at least one factors which could be used to detect urban driving conditions as distinct from rural driving conditions is used to precisely descriminate urban driving conditions from rural driving conditions.

Figure 14:
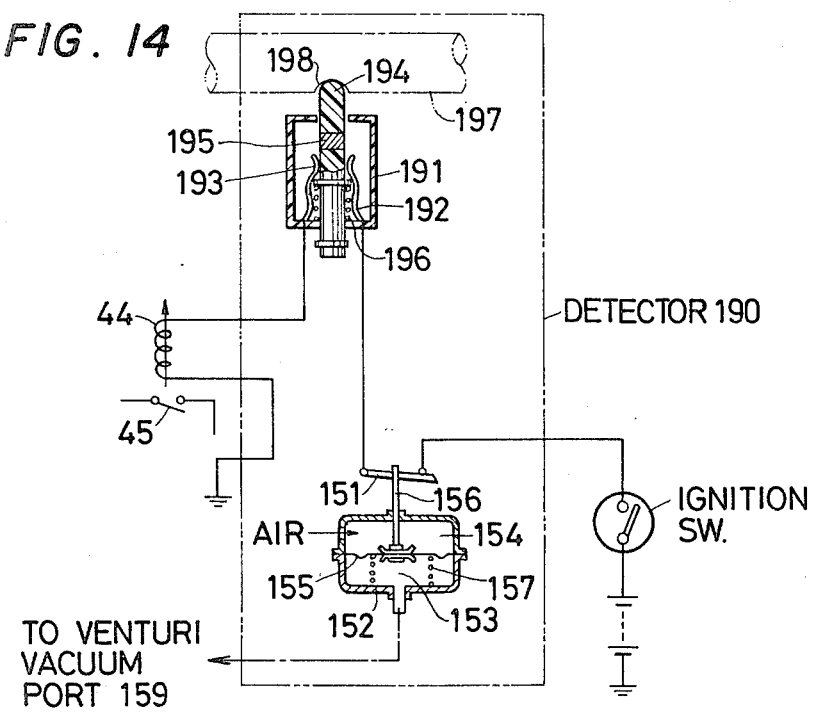

Detector 190 shown in FIG. 14 differs from detector 50 shown in FIG. 10 in that a gear switch 191 is connected in series with a venturi vacuum responsive switch 151. Gear switch 191 has two contact fingers 192 and 193 which is separated from the former by a plunger 194 of an insulating material. Plunger 194 has a bridge section 195 of a conductive material adapted to bridge between contact fingers 192 and 193. A spring 196 is provided to bias plunger 194 against the peripheral surface of a control rod 197 of a transmission. When the transmission is conditioned within a high speed range, control rod 197 is in a position in which a recess 198 formed in control rod 197 is aligned with plunger 194 to receive it. Then, plunger 194 is in the illustrated position in which contact fingers 192 and 193 are electrically separated and switch 191 is open. When the transmission is conditioned within a low speed range, recess 198 is out of alignment with plunger 194 and thus the peripheral surface of control rod 197 contacts with plunger 194, urging plunger 194 downwards (viewing in FIG. 14) against the bias of spring 196 toward a position in which contact bridge 195 contacts with both contact fingers 192 and 193, and thus switch 191 is closed. It will be noted that both switches 191 and 151 are closed to energize relay coil 44 to close relay switch 45 when the motor vehicle is driven in urban areas, while, when the motor vehicle is driven in rural areas, one or both of switches 191 and 151 are opened to cut the supply of current to relay coil 44 to cause relay switch 45 to be opened.

If the transmission is a four speed transmission, the high speed range consists of 4th speed(top gear), while, the low speed range consists of the other speeds which include 1st, 2nd and 3rd speeds. If the transmission is a three speed transmission, the high speed range consists of 3rd speed, while, the low speed range includes 1st and 2nd speeds. If the transmission is a five speed transmission including an overdrive, the high speed range consists of 4th speed and overdrive, while, the low speed range consists of the other speeds which include 1st, 2nd and 3rd speeds.

Figure 15:
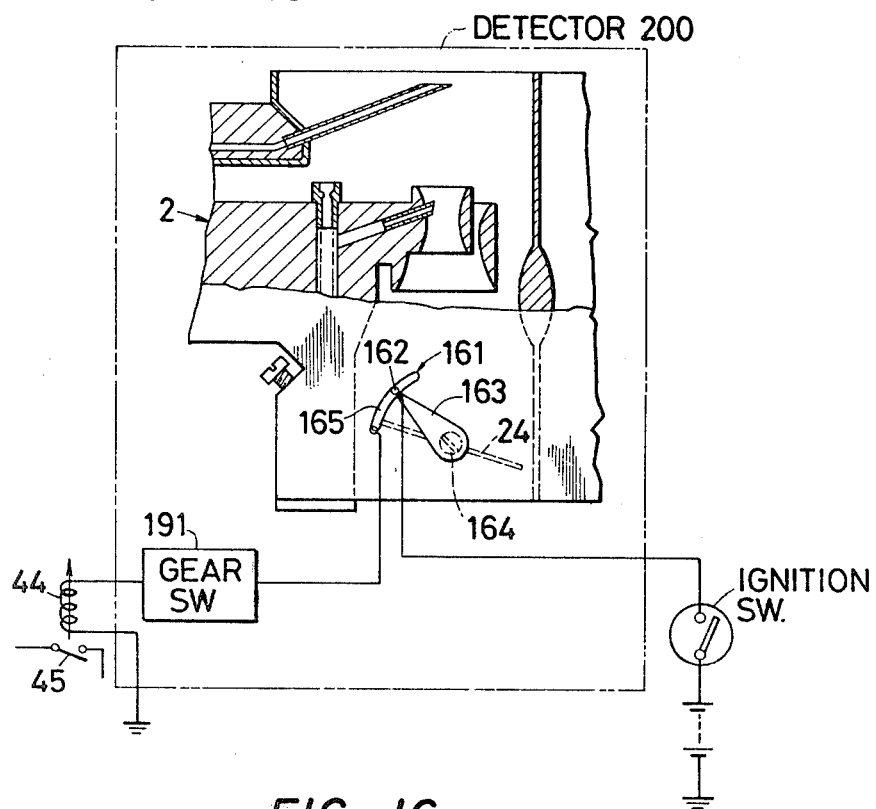

Detector 200 shown in FIG. 15 is different from detector 160 shown in FIG. 11 in that a gear switch 191 used in detector 190 shown in FIG. 14 is connected in series with a throttle opening degree responsive switch 161.

Figure 16:
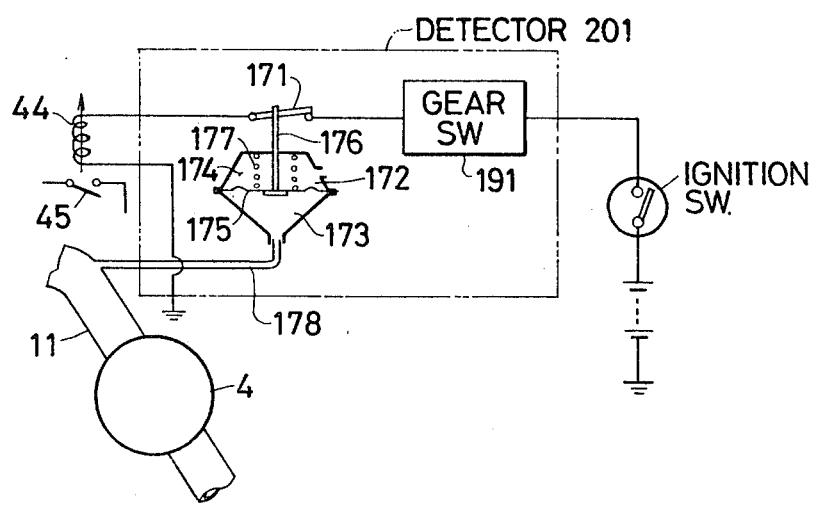

Detector 201 shown in FIG. 16 is different from detector 170 shown in FIG. 12 in that a gear switch 191 used in detector 190 shown in FIG. 14 is connected in series with an exhaust gas pressure responsive switch 171.

Figure 17:
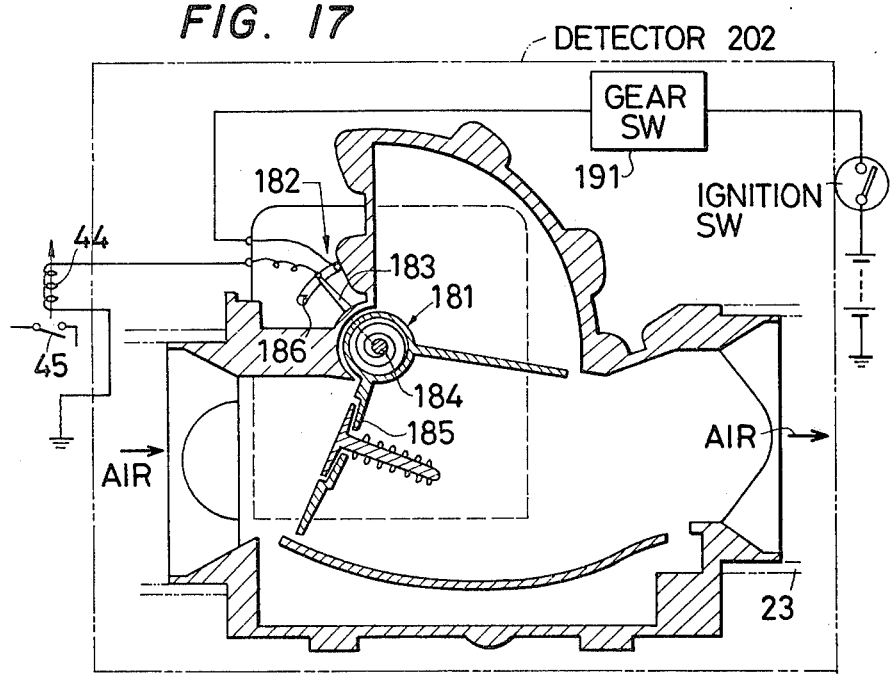

Detector 202 shown in FIG. 17 is different from detector 180 shown in FIG. 13 in that a gear switch 191 used in detector 190 shown in FIG. 14 is connected in series with an air flow switch 182.

Figure 18:
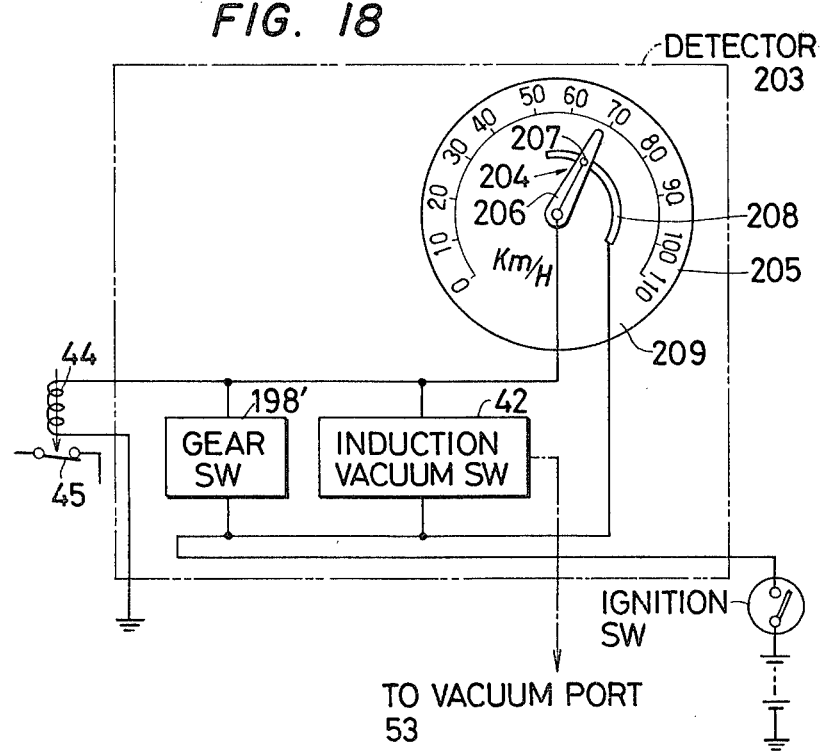

Referring to FIG. 18, a detector 203 shown herein uses a vehicle speed responsive switch 204, an engine induction vacuum responsive switch 42 used in detector 40 shown in FIG. 2 and a gear switch 191'.

Vehicle speed responsive switch 204 is controlled by a vehicle speed meter 205 having a pointer 206. Switch 204 has a point contact 207 and a plate contact 208 attached to an indicator disc 209 of meter 205. Plate contact 208 is arranged such that when vehicle speed is higher than a predetermined value of, for example, 50 km/h, point contact 207 is in slidable contact with plate contact 208 so that switch 204 is closed, while, when vehicle speed is lower than this predetermined value, point contact 207 is kept out of contact with plate contact 208 so that switch 204 is open. Switch 204 is connected in series with a relay coil 44 for normally closed relay switch 45.

Induction vacuum responsive switch 42 is designed to be closed when the engine induction vacuum is lower than a predetermined level of, for example, −100 MHg, but it is opened when the induction vacuum is higher than this predetermined level. Switch 42 is connected in parallel to switch 204.

Gear switch 191' is designed to be closed when the transmission is conditioned within a high speed range, but to be opened when the transmission is conditioned within a low speed range. Gear Switch 191' is connected in parallel to switches 42 and 204.

It will be noted that detector 203 takes OFF condition when the motor vehicle is driven in urban areas, while, when the motor vehicle is driven in rural areas it takes ON condition. Thus, relay switch 45 is of the normally closed type. It is possible to use instead of vehicle speed responsive switch 204 an engine speed responsive switch 43 used in detector 40 shown in FIG. 2, if desired.

Referring to FIG. 19, a detector 210 is different from detector 82 shown in FIG. 5 in that a gear switch 211 is connected in series with an induction vacuum responsive switch 83 and an engine driven pump pressure switch 84.

Gear switch 211 is controlled by a diaphragm device 212 having a pressure chamber 213 and an atmospheric chamber 214 which is separated from the former by a diaphragm 215. Diaphragm 215 is operatively connected to switch 211 by a connecting rod 216. Spring 217 is mounted within atmospheric chamber 214 to bias connecting rod 216 toward the illustrated position in which switch 211 is closed. Conduit 218 connects pressure chamber 213 to a portion of an automatic transmission where there will be an oil pressure rise when the transmission is conditioned in a high speed range. Switch 211 is therefore opened in response to the oil pressure rise when the automatic transmission is conditioned in the high speed range.

What is claimed is:

1. An engine system of a motor vehicle comprising:
   an internal combustion engine;
   intake means for admitting an air fuel mixture to said engine;
   exhaust means, including an exhaust gas treatment device, for directing exhaust gases resulting from combustion of the air fuel mixture toward the open air;
   an exhaust gas recirculation system having an exhaust gas recirculation conduit having one end connected to said exhaust means and the other end connected to said intake means for permitting a portion of the exhaust gases to pass therethrough toward said intake means to mix with the air fuel mixture, said exhaust gas recirculation system having an exhaust gas recirculation valve means for controllably passing a flow of fluid passing through said exhaust gas recirculation conduit;
   a controller including detector means responsive to driving conditions of the vehicle which occur when the vehicle is driven in urban areas to produce a first output signal, and responsive to driving conditions which occur when the vehicle is driven in rural areas to produce a second output signal, said controller including means for maintaining said first and second output signals, respectively, for a given period after cessation of the conditions which induced same;
   a source of secondary air;
   fluid network means interconnecting said source of secondary air, an upstream section of said exhaust gas recirculation conduit of said exhaust gas recirculation valve, and said exhaust means at a position upstream of said exhaust gas treatment device;
   air injection control means for permitting a portion of air from said source of secondary air to be admitted to said exhaust gas recirculation conduit through said fluid network means when said controller detects said rural driving conditions and for preventing the admission of air when said controller detects said urban driving conditions.

2. An engine system as claimed in claim 1, in which said exhaust means comprises:
   a first passage means whereby a portion of the exhaust gases from said engine will be directed to said exhaust gas treatment device, said first passage means being connected to said fluid network means to receive air from said source of secondary air; and
   a second passage means whereby the remaining portion of the exhaust gases from said engine will be directed to said exhaust gas treatment device, said second passage means being connected to said exhaust gas recirculation conduit to permit a portion of the exhaust gases therein to be admitted to said intake means through said exhaust gas recirculation conduit.

3. An engine system as claimed in claim 2, in which said controller includes means for urging said air injection control means to permit the admission of air to said exhaust gas recirculation conduit when said engine idles or operates at deceleration; and in which said exhaust gas recirculation system comprises means for urging said exhaust gas recirculation valve to close said exhaust gas recirculation conduit when said engine idles or operates at deceleration, whereby when said engine idles or operates at deceleration, air will be admitted to said second passage means through said upstream section of said exhaust gas recirculation conduit.

4. An engine system of a motor vehicle comprising:
   an internal combustion engine;
   intake means for admitting an air fuel mixture to said engine;
   exhaust means, including an exhaust gas treatment device, for directing exhaust gases resulting from combustion of the air fuel mixture toward the open air;
   an exhaust gas recirculation system having an exhaust gas recirculation conduit having one end connected to said exhaust means and the other end connected to said intake means for permitting a portion of the exhaust gases to pass therethrough toward said intake means to mix with the air fuel mixture, said exhaust gas recirculation system having an exhaust gas recirculation valve means for controllably passing a flow of fluid passing through said exhaust gas recirculation conduit;
   a controller responsive to rural driving conditions which occur when the motor vehicle is driven in rural areas and to urban driving conditions which occur when the motor vehicle is driven in urban areas;
   said controller comprising detector means which generates a first output signal responsive to said urban driving conditions and a second output signal responsive to said rural driving conditions;
   hold circuit means which generates a first output signal when detector means generates a first output signal and for a predetermined time after the output of said detector means has shifted from said first output signal to said second output signal and generates a second output signal after said predetermined time;
   a source of secondary air;
   fluid network means interconnecting said source of secondary air, an upstream section of said exhaust gas recirculation conduit of said exhaust gas recirculation valve, and said exhaust means at a position upstream of said exhaust gas treatment device; and
   an air injection control means for permitting a portion of air from said source of secondary air to be admitted to said exhaust gas recirculation conduit through said fluid network means when said controller detects said rural driving conditions and for preventing the admission of air when said controller detects said urban driving conditions;

said air injection control means preventing the admission of air to said exhaust recirculation conduit when said hold circuit means generates said first output signal but will permit the admission of air to said exhaust gas recirculation conduit when said hold circuit means generates said second output signal.

5. An engine system as claimed in claim 1, in which said air injection control means will prevent the admission of air to said exhaust gas recirculation conduit when said detector means generates said first output signal, but will permit the admission of air to said exhaust gas recirculation conduit when said detector means generates said second output signal.

6. An engine system as claimed in claim 4, in which said air injection control means has:

an air injection control valve fluidly disposed in said fluid network intermediate said source of secondary air and said exhaust gas recirculation conduit, said air injection control valve having an open position in which the admission of air to said exhaust gas recirculation conduit through said fluid network means is permitted and a closed position in which the admission of air to said exhaust gas recirculation conduit through said fluid network means is prevented.

7. An engine system as claimed in claim 6, in which said air injection control means comprises:

a solenoid actuator operatively connected to said air injection control valve.

8. An engine system as claimed in claim 6, in which said air injection control means comprises:

a vacuum actuator operative connected to said air injection control valve.

9. An engine system as claimed in claim 7, in which said hold circuit means comprises:

a source of vacuum;

a vacuum tank provided with an air bleed having a flow restrictor;

a vacuum conduit means interconnecting said source of vacuum and said vacuum tank;

a valve means fluidly disposed in said vacuum conduit means, said valve means taking an open position upon reception of said first signal and taking a closed position upon reception of said second signal;

a vacuum switch circuited in series with said solenoid actuator, said vacuum switch being responsive to pressure within said vacuum tank.

10. An engine system as claimed in claim 8, in which said hold circuit means comprises:

a source of vacuum;

a vacuum conduit means interconnecting said vacuum actuator and said source of vacuum a vacuum tank provided with an air bleed having a flow restrictor and fluidly disposed in said vacuum conduit means intermediate said vacuum actuator and said source of vacuum;

a valve means fluidly disposed in said vacuum conduit means intermediate said source of vacuum and said vacuum tank said valve means taking an open position upon reception of said first signal and taking a closed position upon reception of said second signal.

11. An engine system as claimed in claim 8, in which said hold circuit means comprises:

a source of vacuum;

a vacuum conduit means interconnecting said source of vacuum and said vacuum actuator;

a selector valve means fluidly disposed in said vacuum conduit means for applying to said vacuum actuator a vacuum from said source of vacuum upon reception of said first signal and atmospheric pressure upon reception of said second signal; and means fluidly disposed in said vacuum conduit means intermediate said vacuum actuator and said selector valve means for delaying the transmission of the atmospheric pressure to said vacuum actuator for a predetermined time.

12. An engine system as claimed in claim 6, in which said hold circuit means comprises:

a time constant circuit.

13. An engine system as claimed in claim 4, in which said rural driving conditions and urban driving conditions are represented by the combination of engine speed and engine induction vacuum.

14. An engine system as claimed in claim 4, in which said rural driving conditions and urban driving conditions are represented by the combination of vehicle speed and engine induction vacuum.

15. An engine system as claimed in claim 13, in which said detector means comprises:

an engine speed switch having a contact attached to an indicator of an engine revolution speed meter; and a contact attached to a pointer of the engine speed meter.

16. An engine system as claimed in claim 14, in which said detector means comprises:

a vehicle speed switch having a contact attached to an indicator of a vehicle speed meter; and a contact attached to a pointer of the vehicle speed meter.

17. An engine system as claimed in claim 13, in which said detector means comprises:

a pressure switch responsive to discharge pressure of an air pump driven by the engine.

18. An engine system as claimed in claim 13, in which said detector means comprises:

a pressure switch responsive to discharge pressure of an oil pump driven by the engine.

19. An engine system as claimed in claim 13, in which said detector means comprises:

a vacuum switch, responsive to engine induction vacuum.

20. An engine system as claimed in claim 4, in which said rural driving conditions and urban driving conditions are represented by the flow rate of engine intake air.

21. An engine system as claimed in claim 20, in which said detector means comprises:

a venturi vacuum switch responsive to variations of the venturi vacuum.

22. An engine system as claimed in claim 20, in which said detector means comprises:

a throttle switch responsive to the throttle opening degree.

23. An engine system as claimed in claim 20, in which said detector means comprises:

a exhaust pressure switch responsive to the engine exhaust pressure.

24. An engine system as claimed in claim 20, in which said detector means comprises:
an air flow sensor switch controlled by an air flow sensor.

25. An engine system as claimed in claim 4, in which said rural driving conditions and urban driving conditions are represented by the combination of a predetermined speed range of a transmission and the flow rate of engine intake air.

26. An engine system as claimed in claim 4, in which said rural driving conditions and urban driving conditions are represented by the combination of a predetermined speed range of a transmission, engine induction vacuum and engine speed.

27. An engine system as claimed in claim 4, in which said rural driving conditions and urban driving conditions are represented by the combination of a predetermined speed range of a transmission, engine induction vacuum and vehicle speed.

28. An engine system as claimed in claim 25, in which said detector means comprises:
a gear switch responsive to the predetermined speed range of the transmission; and
a venturi vacuum switch responsive to variations of the engine venturi vacuum.

29. An engine system as claimed in claim 25, in which said detector means comprises:
a gear switch responsive to the predetermined speed range of the transmission; and
a throttle switch responsive to the throttle opening degree.

30. An engine system as claimed in claim 25, in which said detector means comprises:
a gear switch responsive to the predetermined speed range of the transmission; and
an exhaust pressure switch responsive to the engine exhaust pressure.

31. An engine system as claimed in claim 25, in which said detector means comprises:
a gear switch responsive to the predetermined speed range of the transmission; and
an air flow switch controlled by an air flow sensor.

32. An engine system as claimed in claim 27, in which said detector means comprises:
a gear switch responsive to the predetermined speed range of the transmission;
a induction vacuum switch responsive to variation of the engine induction vacuum; and
a vehicle speed switch controlled by a vehicle speed meter.

33. An engine system as claimed in claim 26, in which said detector means comprises:
a gear switch responsive to the predetermined speed range of the transmission;
an induction vacuum switch responsive to variations of the engine induction vacuum; and
a pump pressure switch responsive to the discharge pressure of an engine driven pump.

* * * * *